United States Patent
Jeol et al.

(10) Patent No.: US 11,572,443 B2
(45) Date of Patent: Feb. 7, 2023

(54) PROCESS FOR PREPARING FUNCTIONALIZED POLY(ARYL ETHER SULFONES) POLYMERS AND BLOCK COPOLYMERS RESULTING THEREFROM

(71) Applicant: SOLVAY SPECIALTY POLYMERS USA, LLC, Alpharetta, GA (US)

(72) Inventors: Stéphane Jeol, Cumming, GA (US); Joel Pollino, Johns Creek, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 16/960,913

(22) PCT Filed: Jan. 18, 2019

(86) PCT No.: PCT/EP2019/051288
§ 371 (c)(1),
(2) Date: Jul. 9, 2020

(87) PCT Pub. No.: WO2019/145235
PCT Pub. Date: Aug. 1, 2019

(65) Prior Publication Data
US 2020/0354524 A1    Nov. 12, 2020

Related U.S. Application Data

(60) Provisional application No. 62/620,555, filed on Jan. 23, 2018.

(30) Foreign Application Priority Data

Feb. 26, 2018 (EP) .................................... 18158622

(51) Int. Cl.
*C08G 75/23* (2006.01)

(52) U.S. Cl.
CPC .................................... *C08G 75/23* (2013.01)

(58) Field of Classification Search
CPC ...... C08G 2261/516; C08G 2261/1452; C08G 2261/722; C08G 18/0828; C08G 75/23; C08G 75/20; H01B 1/122; H01M 8/1025; H01M 8/1027; C08L 81/06
See application file for complete search history.

(56) References Cited

FOREIGN PATENT DOCUMENTS

| CN | 104974341 A | 10/2015 |
|---|---|---|
| JP | 2012211290 A2 | 11/2012 |

OTHER PUBLICATIONS

McCarron, H. E. et al., "Second-order nonlinear optical polymer by directed lithiation of polyethersulfone", Materials Research Society Symposium Proceedings (Electrical, Optical, and Magnetic Properties of Organic Solid-State Materials IV), 1998, vol. 488, pp. 807-812.

*Primary Examiner* — Shane Fang
(74) *Attorney, Agent, or Firm* — Beatrice C. Ortego

(57) ABSTRACT

Poly(aryl ether sulfones) (PAES) polymers (P1) which are functionalized with reactive functional groups on at least one end of the PAES polymer, a process for preparing the PAES polymers (P1), a process for preparing block copolymers (P2) using the functionalized poly(aryl ether sulfones) (PAES) polymers (P1) and the block copolymers (P2) obtainable by such process

17 Claims, No Drawings

PROCESS FOR PREPARING FUNCTIONALIZED POLY(ARYL ETHER SULFONES) POLYMERS AND BLOCK COPOLYMERS RESULTING THEREFROM

RELATED APPLICATIONS

This application is a U.S. national stage entry under 35 U.S.C. § 371 of International Application No. PCT/EP2019/051288 filed Jan. 18, 2019, which claims priority to U.S. provisional application No. U.S. 62/620,555, filed on Jan. 23, 2018 and to European patent application No. EP 18158622.3, filed on Feb. 26, 2018, the whole content of each of these applications being incorporated herein by reference for all purposes.

TECHNICAL FIELD

The present invention relates to functionalized poly(aryl ether sulfones) (PAES) polymers (P1) and to the process for preparing the PAES polymers (P1). The present invention also relates to a method for preparing block copolymers (P2) using the functionalized poly(aryl ether sulfones) (PAES) polymers (P1) and to the block copolymers (P2) themselves.

BACKGROUND

Poly(aryl ether sulfones) (PAES) polymers belong to the group of high-performance thermoplastics and are characterized by high heat distortion resistance, good mechanical properties, excellent hydrolytic resistance and an inherent flame retardance. Versatile and useful, PAES polymers have many applications in electronics, electrical industry, medicine, general engineering, food processing and 3D printing.

While PAES polymers have many advantages, and good physical properties, it is sometimes desirable to tune these properties to improve performance in specific applications. For example, in membrane filtration, increasing the hydrophilicity of PAES is sometimes desired to improve key membrane performance attributes such as flow rate. Basic property modification, including but not limited to hydrophilicity, is oftentimes achieved by combining two homopolymers to make block copolymers that possess the combination of intrinsic properties of each individual homopolymer. For example, in membrane applications, a PAES homopolymer can be covalently linked to a hydrophilic homopolymer to synthesize a new PAES-hydrophilic block copolymer possessing superior membrane performance owing to the enhanced flow caused by the hydrophilic component while retaining the mechanically robust and amorphous pore structure of the PAES component. Aside from improving membrane properties, other notable performance attributes can also be improved by synthesizing block copolymer architectures with PAES including compatibilization of two incompatible blends to improve polymer alloy performance, introducing block segments that increase stiffness (modulus), and adding block segments that increase chemical resistance. Additionally, unique structured nanomaterial architectures can be accessed by the self-assembly of block copolymers.

The present invention notably provides a process for functionalizing PAES polymers with reactive end groups. These functionalized PAES polymers are important intermediates on the way to making complex polymer architectures, including block copolymers.

SUMMARY

The present invention notably provides a process for preparing block copolymers from poly(aryl ether sulfones) (PAES) wherein the PAES polymers are functionalized with reactive functional groups on at least one end of the PAES polymer. The present invention therefore provides a way to introduce functionality to the chain terminus of PAES polymers and the resulting intermediates can then be used further to synthetize block copolymers by solution chemistry or chemistry carried out in the molten phase (for instance reactive extrusion). The chain-end functional group is reactive and can therefore be used to efficiently prepare block copolymers.

The present invention relates to functionalized PAES polymers (P1), as well as PAES block copolymers (P2) prepared from the functionalized PAES polymers (P1).

DISCLOSURE OF THE INVENTION

The present invention relates to a functionalized poly(aryl ether sulfone) (PAES) polymer (P1). This polymer can for example be used for preparing block copolymers (P2) including PAES block polymer (P1) and at least another distinct block polymer (P3), for example aliphatic block polymers selected from polyolefins, polyesters (PE), poly-alkylene oxide, polysiloxanes, polyamides (PA) and polyfluoropolymers, or aromatic block polymers selected from poly(aryl ether sulfone) (PAES) distinct from polymer (P1), poly(aryl ether ketone) (PAEK), poly(aryl sulphide) (PAS), poly(ether imide) (PEI), polyphenylene ether (PPE), Liquid Crystalline Polyester (LCP), polycarbonate (PC), polyimide (PI) and polyamideimide (PAI). In particular, the PAES polymer (P1) can be a functionalized PPSU polymer, a functionalized PSU polymer or a functionalized PES polymer.

The PAES polymer of the present invention is functionalized with a functional group, which is —$(CH_2)_{y1}$—R'—$(CH_2)_{y2}$—X, wherein:

y1 and y2 independently vary between 0 and 50, at least one of y1 or y2 being different from 0;

R' is a bond, a heteroatom, a $(CH_2$—$CH_2$—$O)_n$ group with n varying from 1 to 16, a C5-C40 aryl group, a C3-C40 branched aliphatic group or a C3-C40 cycloaliphatic group; and X is Cl, Br or I.

The functional groups are introduced by post-polymerization modification of at least one end of the polymer chain, for example at both ends of the polymer chain. More precisely, the PAES polymer (P1) of the present invention is functionalized on at least one end of the PAES polymer chain, as a "terminal functionalization". The PAES polymer (P1) of the present invention is preferably functionalized at both ends of the PAES polymer chain.

The functionalized PAES (P1) of the present invention can, for example, be used as intermediates for preparing sulfonated/nonsulfonated block copolymers for membrane application PAES block copolymers containing hydrophilic chain segments for example for membrane applications, as functional RAFT chain transfer agents and as quarternized amine/pyridine based chain end functionalized systems (e.g. antimicrobial systems).

PAES Polymer (P1)

The poly(aryl ether sulfone) (PAES) polymer (P1) of the present invention comprises:

recurring units ($R_{PAES}$) of formula (L):

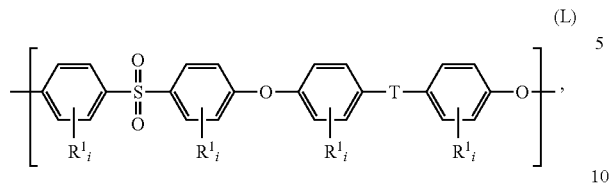

at least one terminal group of formula (M):

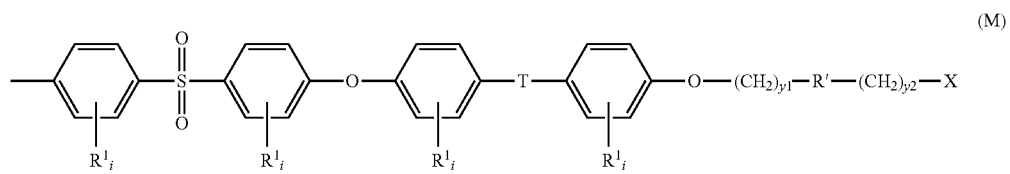

wherein:
- each $R^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- each i is an independently selected integer from 0 to 4;
- T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof;
- y1 and y2 independently vary between 0 and 50, at least one of y1 or y2 being different from 0;
- R' is a bond, a heteroatom, a (CH$_2$—CH$_2$—O)$_n$ group with n varying from 1 to 16, a C5-C40 aryl group, a C3-C40 branched aliphatic group or a C3-C40 cycloaliphatic group; and
- X is Cl, Br or I.

According to an embodiment, $R^1$ is, at each location in formulas (L) and/or (M) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, i is zero for each $R^1$ or formulas (L) and/or (M). In other words, according to this embodiment, the recurring units ($R_{PAEs}$) may be units of formula (L'):

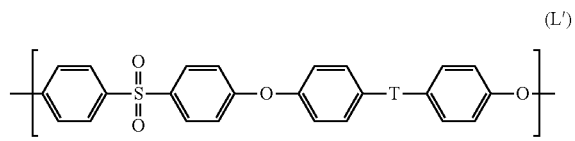

According to this embodiment, the at least one terminal group of the PAES polymer (P1) may be of formula (M'):

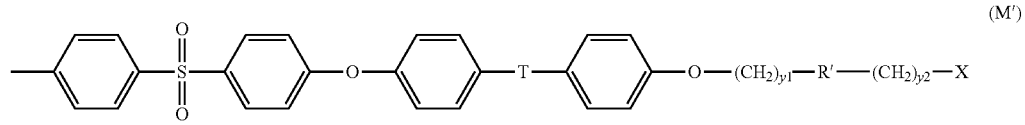

According to another embodiment of the present invention, the PAES polymer (P1) comprises at least 50 mol. % (based on the total number of moles in the polymer) of recurring units of formula (L) and/or (L').

According to another embodiment of the present invention, at least 60 mol. %, at least 70 mol. %, at least 80 mol. %, at least 90 mol. %, at least 95 mol. %, at least 99 mol. % or all of the recurring units in the PAES polymer (P1) are recurring units ($R_{PAES}$) of formula (L) or formula (L').

According to an embodiment, the PAES polymer (P1) of the present invention has a Tg ranging from 120 and 250° C., preferably from 170 and 240° C., more preferably from 180 and 230° C., as measured by differential scanning calorimetry (DSC) according to ASTM D3418.

According to an embodiment of the present invention, the PAES polymer (P1) is such that T is selected from the group consisting of a bond, —$SO_2$— and —$C(CH_3)_2$—.

According to yet another embodiment of the present invention, the PAES polymer (P1) comprises at least 50 mol. % (based on the total number of moles in the polymer) of recurring units selected from the group consisting of formulas:

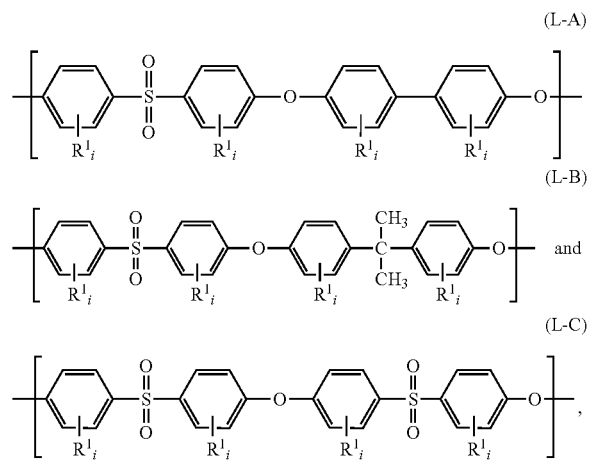

wherein $R^1$ and i are as above-mentioned.

According to yet another embodiment of the present invention, the PAES polymer (P1) comprises at least 50 mol. % (based on the total number of moles in the polymer) of recurring units selected from the group consisting of formulas (L-A), (L-B) and (L-C), wherein i is zero for each $R^1$.

According to yet another embodiment of the present invention, the PAES polymer (P1) comprises at least one terminal group of the PAES polymer (P1) may be of formula (M-A), (M-B) or (M-C):

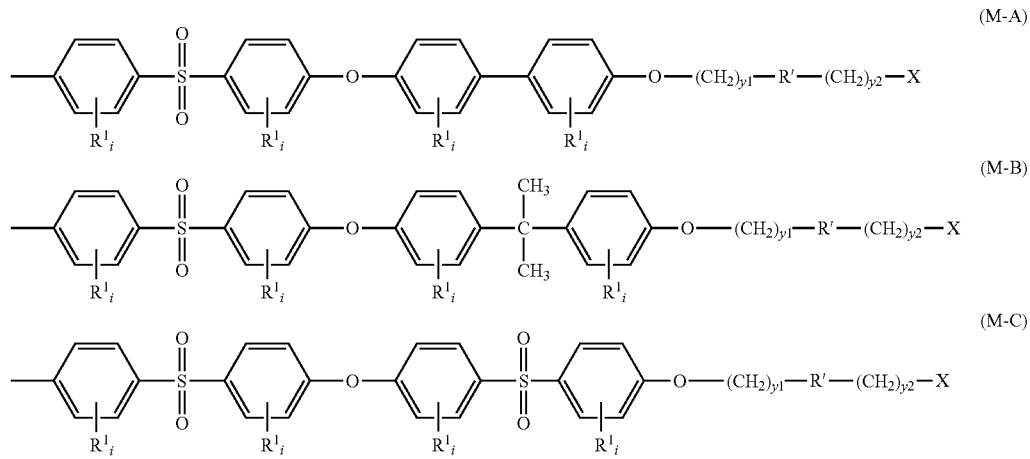

wherein $R^1$, i, y1, y2, R' and X are as above-mentioned.

According to yet another embodiment of the present invention, the PAES polymer (P1) comprises at least one terminal group of the PAES polymer (P1) may be of formulas (M-A), (M-B) or (M-C) wherein i is zero for each $R^1$. Preferably, both terminal group of the PAES polymer (P1) are of formulas (M-A'), (M-B') or (M-C') wherein i is zero for each $R^1$.

According to an embodiment, the PAES polymer (P1) is a poly(biphenyl ether sulfone) (PPSU) with at least 50 mol. % of (based on the total number of moles in the polymer) of recurring units ($R_{PPSU}$) of formulas (L-A) or (L-A') wherein i is zero for each $R^1$; for example according to this embodiment, the PAES polymer (P1) is a PPSU with at least 60 mol. %, at least 70 mol. %, at least 80 mol. %, at least 90 mol. %, at least 95 mol. %, at least 99 mol. % of recurring units ($R_{PPSU}$) of formula (L-A) or formula (L-A'). According to another embodiment, all of the recurring units in the PAES polymer (P1) are recurring units ($R_{PPSU}$) of formulas (L-A) or (L-A') wherein i is zero for each $R^1$.

A poly(biphenyl ether sulfone) polymer (PPSU) is a polyarylene ether sulfone which comprises a biphenyl moiety. Poly(biphenyl ether sulfone) is also known as polyphenyl sulfone (PPSU) and for example results from the condensation of 4,4'-dihydroxybiphenyl (biphenol) and 4,4'-dichlorodiphenyl sulfone.

The poly(biphenyl ether sulfone) (PPSU) can be prepared by any method known in the art. It can for example result from the condensation of 4,4'-dihydroxybiphenyl (biphenol) and 4,4'-dichlorodiphenyl sulfone in presence of a base. The reaction of monomer units takes place through nucleophilic aromatic substitution with the elimination of one unit of hydrogen halide as leaving group. It is to be noted however that the structure of the resulting poly(biphenyl ether sulfone) does not depend on the nature of the leaving group.

PPSU is commercially available as Radel® PPSU from Solvay Specialty Polymers USA, L.L.C.

According to an embodiment, the PAES polymer (P1) is a polysulfone (PSU) polymer with at least 50 mol. % of (based on the total number of moles in the polymer) of recurring units ($R_{PSU}$) of formulas (L-B) or (L-B') wherein i is zero for each $R^1$; for example according to this embodiment, the PAES polymer (P1) is a PSU with at least 60 mol. %, at least 70 mol. %, at least 80 mol. %, at least 90 mol. %, at least 95 mol. %, at least 99 mol. % of recurring units ($R_{PSU}$) of formula (L-B) or formula (L-B'). According to another embodiment, all of the recurring units in the PAES polymer (P1) are recurring units ($R_{PSU}$) of formulas (L-B) or (L-B') wherein i is zero for each $R^1$.

PSU is available as Udel® PSU from Solvay Specialty Polymers USA, L.L.C.

According to an embodiment, the PAES polymer (P1) is a polyethersulfone (PES) polymer with at least 50 mol. % of (based on the total number of moles in the polymer) of recurring units ($R_{PES}$) of formulas (L-C) or (L-C') wherein i is zero for each $R^1$; for example according to this embodiment, the PAES polymer (P1) is a PES with at least 60 mol. %, at least 70 mol. %, at least 80 mol. %, at least 90 mol. %, at least 95 mol. %, at least 99 mol. % of recurring units ($R_{PES}$) of formula (L-C) or formula (L-C'). According to another embodiment, all of the recurring units in the PAES polymer (P1) are recurring units ($R_{PES}$) of formulas (L-C) or (L-C') wherein i is zero for each $R^1$.

PES is available as Veradel® PES from Solvay Specialty Polymers USA, L.L.C.

According to an embodiment of the present invention, the PAES polymer (P1) has a number average molecular weight (Mn) of less than about 25,000 g/mol, less than about 18,000 g/mol, or less than about 17,000 g/mol, as measured by gel permeation chromatography (GPC) using methylene chloride as a mobile phase, with polystyrene standards.

According to an embodiment of the present invention, the PAES polymer (P1) has a number average molecular weight (Mn) of no less than about 1,000 g/mol or no less than about 2,000 g/mol, as measured by gel permeation chromatography (GPC) using methylene chloride as a mobile phase, with polystyrene standards.

According to an embodiment of the present invention, R' in formula (M) or (M') is preferably a bond or a ($CH_2$—$CH_2$—O)$_n$ group with n varying from 1 to 16. Most preferably, R' is a bond.

According to an embodiment, either y1 or y2 equals zero.

According to another embodiment, y2 equals zero and R' is a bond.

According to this embodiment, the at least one terminal group of the PAES polymer (P1) may be of formula (M"):

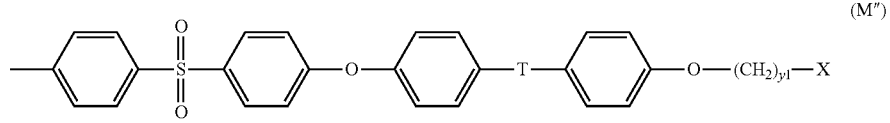

(M")

wherein
y1 varies between 1 and 50, for example between 2 and 40, between 3 and 30, between 4 and 20 or between 4 and 10;
X is Cl, Br or I, preferably Br.

According to an embodiment, y1 and y2 independently vary between 0 and 40, and at least one of y1 or y2 is different from 0. Preferably, y1 and y2 independently varies between 0 and 30, and at least one of y1 or y2 is different from 0. More preferably, y1 and y2 independently varies between 0 and 20, and at least one of y1 or y2 is different from 0. Most preferably, y1 and y2 independently varies between 0 and 10, and at least one of y1 or y2 is different from 0.

According to a preferred embodiment, the poly(aryl ether sulfone) (PAES) polymer (P1) consists essentially in:

1/ recurring units ($R_{PAES}$) of formula (L):

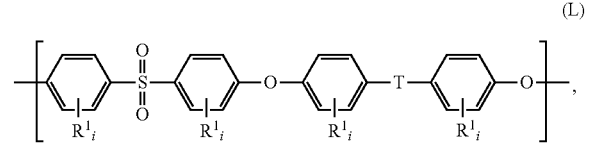

(L)

2/ one or two terminal groups of formula (M):

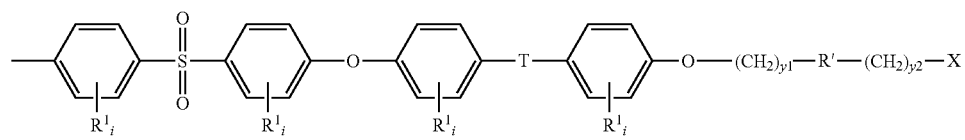

(M)

wherein:
each $R^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each i is an independently selected integer from 0 to 4;
T is selected from the group consisting of a bond, —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—;
$R_aC$=$CR_b$—, where each $R_a$ and $R_b$, independently of one another, is a hydrogen or a C1-C12-alkyl, C1-C12-alkoxy, or C6-C18-aryl group; —($CH_2$)$_m$— and —($CF_2$)$_m$— with m being an integer from 1 to 6; an aliphatic divalent group, linear or branched, of up to 6 carbon atoms; and combinations thereof;
y1 and y2 independently vary between 0 and 50, at least one of y1 or y2 being different from 0;

R' is a bond, a heteroatom, a (CH$_2$—CH$_2$—O)$_n$ group with n varying from 1 to 16, a C5-C40 aryl group, a C3-C40 branched aliphatic group or a C3-C40 cycloaliphatic group; and X is Cl, Br or I.

According to this embodiment, P1 is made exclusively of recurring units (R$_{PAES}$) of formula (L) and comprises one or two terminal groups of formula (M).

According to another preferred embodiment, the poly(aryl ether sulfone) (PAES) polymer (P1) consists essentially in:
1/ recurring units (R$_{PAES}$) of formula (L-A), (L-B) or (L-C) and
2/ one or two terminal groups of formula (M-A), (M-B) or (M-C),
wherein R$^1$, i, y1, y2, R' and X are as above-mentioned.

Preferably according to this embodiment, i is zero for each R$^1$.

Process for Preparing Functionalized PAES Polymer (P1)

The functional groups are introduced as a post-polymerization modification at least one end of a PAES polymer chain, for example at both ends of the polymer chain.

More precisely, the process to prepare the poly(aryl ether sulfone) (PAES) polymer (P1) as described-above comprises the steps of reacting a poly(aryl ether sulfone) (PAES) polymer (P0) comprising:

recurring units (R$_{PAES}$) of formula (N):

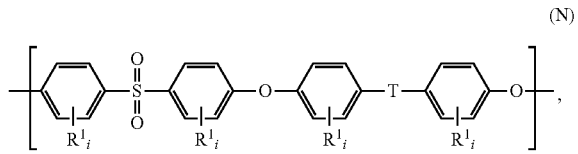

(N)

and
at least one terminal group of formula (P):

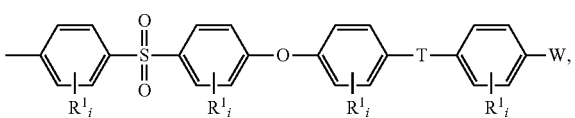

(P)

wherein:
each R$^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
each i is an independently selected integer from 0 to 4;
W is O—R or S—R; and
R is H, K, Na, Li, Cs, or NHQ, where Q is a group containing 1 to 10 carbon atoms;

with a compound of formula (I)

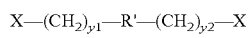

X—(CH$_2$)$_{y1}$—R'—(CH$_2$)$_{y2}$—X (I)

wherein
X is Cl, Br or I;
y1 and y2 independently varies between 0 and 50, at least one of y1 or y2 being different from 0;

R' is a bond, a heteroatom, a (CH$_2$—CH$_2$—O)$_n$ group with n varying from 1 to 16, a C5-C40 aryl group, a C3-C40 branched aliphatic group or a C3-C40 cycloaliphatic group; and wherein the molar ratio of compound (I)/polymer (P0) is higher than 1, preferably higher than 5, more preferably higher than 10;
optionally in the presence of a base and a polar aprotic solvent at a temperature ranging from room temperature and 250° C., preferably between 70 and 120° C.

Preferably, W in formula P is O—R. In other words, the poly(aryl ether sulfone) (PAES) polymer (P0) preferably comprises:
at least one terminal group of formula (P-A), for example two terminal groups of formula (P-A):

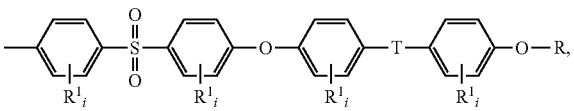

(P-A)

wherein R$^1$, i, T and R are as above-mentioned.

According to an embodiment, the aprotic polar solvent is at least one selected from N-methylpyrrolidone (NMP), N,Ndimethylformamide (DMF), N,N-dimethylacetamide (DMAC), 1,3-dimethyl-2-imidazolidinone, tetrahydrofuran (THF), dimethyl sulfoxide (DMSO) and sulfolane.

According to another embodiment, the base is selected from the group consisting of sodium hydroxide (NaOH), potassium hydroxide (KOH), potassium carbonate (K$_2$CO$_3$), potassium tert-butoxide, sodium carbonate (NaCO$_3$), cesium carbonate (Cs$_2$CO$_3$) and sodium tert-butoxide.

According to an embodiment, R$^1$ is, in formulas (N), (P) and/or (P-A) above, selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, i is zero for each R$^1$ of formula (N). In other words, according to this embodiment, the recurring units (R$_{PAES}$) of P0 may be units of formula (N'):

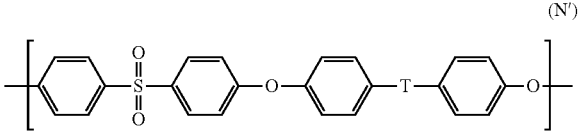

(N')

wherein T is as above-defined.

According to an embodiment, i is zero for each R$^1$ of formula (P-A). In other words, according to this embodiment, the at least one terminal group of formula (P) may be formula (P'):

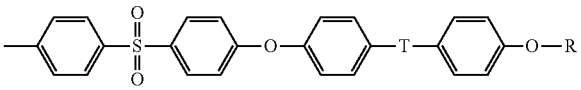

(P-A')

wherein T and R are as above-defined.

According to an embodiment of the present invention, the PAES polymer (P0) is such that T is selected from the group consisting of a bond, —SO$_2$— and —C(CH$_3$)$_2$—.

According to an embodiment, the PAES polymer (P0) is a poly(biphenyl ether sulfone) (PPSU) with at least 50 mol. % of (based on the total number of moles in the polymer) of recurring units (R$_{PPSU}$) of formulas (N) or (N') wherein T is a bond; for example according to this embodiment, the PAES polymer (P0) is a PPSU with at least 60 mol. %, at least 70 mol. %, at least 80 mol. %, at least 90 mol. %, at least 95 mol. %, at least 99 mol. % of recurring units (R$_{PPSU}$) of formula (N) or formula (N').

PPSU is commercially available as Radel® PPSU from Solvay Specialty Polymers USA, L.L.C.

According to an embodiment, the PAES polymer (P0) is a polysulfone (PSU) polymer with at least 50 mol. % of (based on the total number of moles in the polymer) of recurring units (R$_{PSU}$) of formulas (N) or (N') wherein T is —C(CH$_3$)$_2$—; for example according to this embodiment, the PAES polymer (P0) is a PSU with at least 60 mol. %, at least 70 mol. %, at least 80 mol. %, at least 90 mol. %, at least 95 mol. %, at least 99 mol. % of recurring units (R$_{PSU}$) of formula (N) or formula (N').

PSU is available as Udel® PSU from Solvay Specialty Polymers USA, L.L.C.

According to an embodiment, the PAES polymer (P0) is a polyethersulfone (PES) polymer with at least 50 mol. % of (based on the total number of moles in the polymer) of recurring units (R$_{PES}$) of formulas (N) or (N') wherein T is —SO$_2$—; for example according to this embodiment, the PAES polymer (P0) is a PES with at least 60 mol. %, at least 70 mol. %, at least 80 mol. %, at least 90 mol. %, at least 95 mol. %, at least 99 mol. % of recurring units (R$_{PES}$) of formula (N) or formula (N').

PES is available as Veradel® PES from Solvay Specialty Polymers USA, L.L.C.

According to an embodiment of the present invention, the PAES polymer (P0) has a number average molecular weight (Mn) of less than about 25,000 g/mol, less than about 18,000 g/mol, or less than about 17,000 g/mol, as measured by gel permeation chromatography (GPC) using methylene chloride as a mobile phase, with polystyrene standards.

According to an embodiment of the present invention, the PAES polymer (P0) has a number average molecular weight (Mn) of no less than about 1,000 g/mol or no less than about 2,000 g/mol, as measured by gel permeation chromatography (GPC) using methylene chloride as a mobile phase, with polystyrene standards.

According to an embodiment of the present invention, R' in formula (I) is preferably a bond or a (CH$_2$—CH$_2$—O)$_n$ group with n varying from 1 to 16. Most preferably, R' is a bond.

According to an embodiment, in formula (I), either y1 or y2 equals zero.

According to another embodiment, in formula (I), y2 equals zero and R' is a bond. According to this embodiment, the at least one terminal group of the PAES polymer (P1) may be of formula (I'):

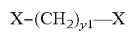
(I')

wherein
y1 varies between 1 and 50, for example between 2 and 40, between 3 and 30, between 4 and 20 or between 4 and 10;
X is Cl, Br or I, preferably Br.

According to an embodiment, in formula (I) or (I'), y1 and y2 independently vary between 0 and 40, and at least one of y1 or y2 is different from 0. Preferably, y1 and y2 independently varies between 0 and 30, and at least one of y1 or y2 is different from 0. More preferably, y1 and y2 independently varies between 0 and 20, and at least one of y1 or y2 is different from 0. Most preferably, y1 and y2 independently varies between 0 and 10, and at least one of y1 or y2 is different from 0.

According to an embodiment of the present invention, the polymer (P0) is in the form of a phenoxide (—O—R) or a phenyl thiolate (—S—R), preferably a phenoxide (—OR).

According to another embodiment of the present invention, the solvent is selected from the group consisting of N-methylpyrrolidone (NMP), N,Ndimethylformamide (DMF), N,N-dimethylacetamide (DMAC), 1,3-dimethyl-2-imidazolidinone, tetrahydrofuran (THF), dimethyl sulfoxide (DMSO) and sulfolane, and/or the base is selected from the group consisting of potassium carbonate (K$_2$CO$_3$), potassium tert-butoxide, sodium carbonate (NaCO$_3$), cesium carbonate (Cs$_2$CO$_3$) and sodium tert-butoxide.

According to a preferred embodiment of the present invention, the polymer (P0) is added to the compound (I) which is in a stoichiometric excess and pre-dissolved in solution. The polymer (P0) is either synthesized in situ or pre-made to target a particular molecular weight by reacting an excess of biphenolic monomer with DCDPS. The specific stoichiometry of this reaction is set up according to the Carother's equation. Subsequently, this phenolic (OH), phenoxide (OM), or mixed OH and OM terminated polymer is reacted further by addition of a base to fully deprotonate all chain end OH groups. In some cases, this reaction with base produces water or alcohols (depending on base type used) that must first be removed by azeotropic distillation prior to yielding the completely converted phenoxide nucleophile. Once generated, the phenoxide nucleophile solution is then added to a stoichiometric excess of the compound (I) pre-dissolved in solution and allowed to stir with heating to form the desired PAES polymer (P0).

Process to Prepare Block Copolymer (P2) and Block Copolymers (P2) Obtained Therefrom The present invention also relates to a process to prepare block copolymers (P2) comprising condensing at least the PAES polymer (P1) as described above, with at least a block polymer (P3), possibly sulfonated, selected from the groups consisting of:
  aliphatic block polymers selected from polyolefins, polyesters (PE), polysiloxanes, polyalkylene oxide (PAO), polyamides (PA) and polyfluoropolymers, and
  aromatic block polymers selected from poly(aryl ether sulfone) (PAES) distinct from polymer (P1), poly(aryl ether ketone) (PAEK), poly(aryl sulphide) (PAS), poly (ether imide) (PEI), polyphenylene ether (PPE), Liquid Crystalline Polyester (LCP), polycarbonate (PC) and polyamideimide (PAI), in the presence of a base and a polar aprotic solvent at a temperature ranging from 50 and 250° C., for example from 70 to 120° C.

The present invention also relates to block copolymers (P2) obtainable by the above-mentioned process.

More precisely, the present invention relates to di-blocks and tri-blocks, as well as multi-block copolymers. They can be used directly for melt processing like molding, extrusion or solution processing like film, membrane, hollow fibers solution casting and also used as compatibilizers for blends of their high molecular weight homologues.

The block copolymer (P2) of the present invention may have a structure as follows:

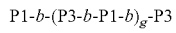

wherein
g varies from 0 to 20, for example from 0 to 10, and
b is $(CH_2)_{y1}$—R'—$(CH_2)_{y2}$, with y1, y2 and R' as above defined, for example b is $(CH_2)_{y1}$.

When P3 is a PAES, it is distinct from P1. For example, when P1 is PPSU,

P3 can for example be PES. According to this embodiment, the block copolymer (P2) may have a structure as follows:

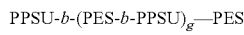

wherein
g varies from 0 to 20, for example from 0 to 10, and
b is $(CH_2)_{y1}$—R'—$(CH_2)_{y2}$, with y1, y2 and R' as above defined, for example b is $(CH_2)_{y1}$.

When P3 is a PAEK, it is preferably a poly(ether ether ketone) (PEEK), a poly(ether ketone ketone) (PEKK), a poly(ether ketone) (PEK) or a copolymer of PEEK and poly(diphenyl ether ketone) (PEEK-PEDEK copolymer).

When P3 is polyalkylene oxide (PAO), it is preferably polyethylene oxide (PEO) or polypropylene oxide (PPO).

When P3 is a polyphenylene ether (PPE), it is preferably a poly(2,6-dimethyl-phenylene oxide) (PPO).

When P3 is a polyfluoropolymer (PF), it is preferably a PVDF (co)polymer or a VDF containing polymer.

When P3 is a polysiloxane, it is preferably a polydimethylsiloxane (PDMS)

According to an embodiment, the condensation takes place at a temperature ranging from 70 and 120° C., in a polar aprotic solvent selected from the group consisting of N-methylpyrrolidone (NMP), N,Ndimethylformamide (DMF), N, N-dimethylacetamide (DMAC), 1,3-dimethyl-2-imidazolidinone, tetrahydrofuran (THF), dimethyl sulfoxide (DMSO) and sulfolane, for at least 1 hour.

Polymer Composition (C)

The present invention also relates to a polymer composition (C) comprising:
the PAES polymer (P1) of the present invention and/or the block copolymer (P2) of the present invention, and
at least one component selected from the group consisting of reinforcing agents, tougheners, plasticizers, colorants, pigments, antistatic agents, dyes, lubricants, thermal stabilizers, light stabilizers, flame retardants, nucleating agents and antioxidants.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXAMPLES

Two functionalized PPSU polymers (P1) were prepared and characterized.

One of these polymers is according to the invention, the other one is a comparative one.

Molecular Weight (Mn & Mw)

Gel permeation chromatography (GPC) analyses were carried out using a Waters 2695 Separations Module and a Waters 2487 Dual Wavelength Absorbance detector with methylene chloride as an eluent on two PLgel 5 μm mixed-D columns (300×7.5 mm). An ultraviolet detector of 254 nm was used to obtain the chromatogram. A flow rate of 1.5 ml/min and injection volume of 15 μL of a 0.2 w/v % solution in mobile phase was selected. Calibration was performed with 10 narrow molecular weight polystyrene standards (Peak molecular weight range: 371,000 to 580 g/mol). The number average molecular weight Mn and weight average molecular weight Mw were reported.

Thermal Gravimetric Analysis (TGA)

TGA experiments were carried out using a TA Instrument TGA Q500. TGA measurements were obtained by heating the sample at a heating rate of 10° C./min from 20° C. to 800° C. under nitrogen.

DSC

DSC was used to determine glass transition temperatures (Tg) and melting points (Tm)—if present. DSC experiments were carried out using a TA Instrument Q100. DSC curves were recorded by heating, cooling, re-heating, and then re-cooling the sample between 25° C. and 320° C. at a heating and cooling rate of 20° C./min. All DSC measurements were taken under a nitrogen purge. The reported Tg and Tm values were provided using the second heat curve unless otherwise noted.

HNMR

HNMR spectra were measured using a 400 MHz Bruker spectrometer with $CDCl_3$ as a solvent. All spectra are reference to residual proton in the solvent.

I. Synthesis of the Functionalized PPSU Polymers (P1)

Example 1—Synthesis of Octyl Bromide Terminated PPSU (PPSU Phenoxy Chain Ends Added to 1,8-Dibromooctane in Excess and Dissolved in Solution) (Inventive and Preferred Way of Component Addition)

This example demonstrates the synthesis of a functionalized PPSU polymer, more precisely functionalized with two terminal molecules according to the following scheme:

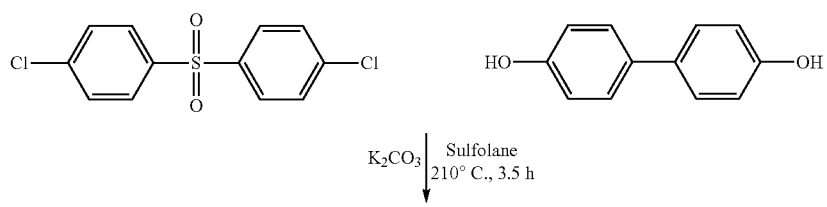

-continued

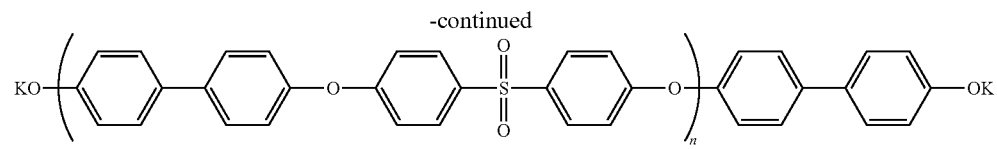

PPSU potassium phenoxide
added to 1,8-dibromooctane
solution $K_2CO_3$ | $Br(CH_2)_8Br$
100° C., 2 h

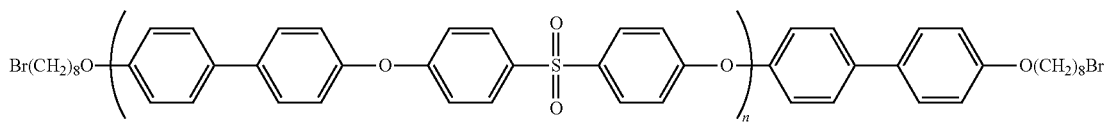

Formation of the KO-PPSU-OK Reactant Solution 4,4'-dichlorodiphenyl sulfone (14.34 g, 0.0499 mol), 4,4'-Biphenol (9.85 g, 0.0529 mol), $K_2CO_3$ (7.67 g, 0.0555 mol), and sulfolane (46.67 g, 30 wt % solids) were combined in a 1 L 4-neck reaction vessel equipped with a mechanical stirrer, a Dean-Stark trap (wrapped in heat tape at ~100° C.), an internal thermometer, and a nitrogen sparge tube. The resulting mixture was then slowly heated with stirring (~30 min) to 210° C. and held at that temperature for 3.5 hours. Following build in molecular weight, the reaction mixture was then cooled to 150° C., diluted with anhydrous NMP (about 17 g), a second charge of $K_2CO_3$ was added (7.67 g, 0.0555 mol), and the mixture was continually stirred at 150° C. This describes the formation of the KO-PPSU-OK reactant solution.

Formation of the 1,8-Dibromooctane Reactant Solution

Separately, in a 250 mL 3 neck round bottomed flask equipped with a mechanical stirrer and nitrogen purge 1,8-dibromooctane (32 g, 0.118 mol, 20 eq to hydroxyl/phenoxide end groups) was dissolved in NMP (16.67 g) and heated to 100° C. with continuous stirring.

Reaction of KO-PPSU-OK with 1,8-Dibromooctane

Subsequently, the KO-PPSU-OK reactant solution at 150° C. was slowly poured into the 1,8-dibromooctane solution stirring at 100° C. Upon complete addition of the KO-PPSU-OK to the 1,8-dibromooctane solution, the resulting mixture was heated to 150° C. and stirred at this temperature for 2 hours and then cooled to 25° C.

Isolation of Final Octyl Bromide Terminated PPSU Polymer

To collect the final polymer, the reaction was further diluted with NMP (13 g), filtered via pressure filtration to remove potassium salts followed by coagulation in a blender using Hot Water (500 mL). The precipitated white solid was then collected via vacuum filtration and repeatedly subjected wash/filtration cycles using hot water (3×500 mL) and was continuously extracted overnight using a Soxhlet extractor with methanol as a solvent to remove the residual 1,8-dibromooctane. The same Soxhlet procedure was repeated a second time using acetone as a solvent. Upon drying the extracted solids in a vacuum oven (110° C., 36 mmHg) for 16 h the final polymer was yielded as a white solid.

Characterization of Octyl Bromide Terminated PPSU Polymer

The material obtained by the aforementioned process was characterized by GPC, TGA, DSC, and HNMR. GPC was used to determine molecular weights (Mn & Mw) and polydispersity index (PDI). TGA was used to determine the decomposition onset at 5% weight loss (Tdec (5% loss)). HNMR was used to determine end group conversions and to confirm expected bond connections. DSC was used to determine glass transition temperatures (Tg) and melting points (Tm), if present.

Results:
Mn=10,699 g/mol
Mw=21,679 g/mol
PDI=2.03
Tg=191° C. No Tm was detected on the first or second heat.

The TGA analysis of the polymer gave a two-step decomposition profile. The first step showed a 2 wt. % loss that started at 298° C. and ended at 368° C. The second step showed a 57 wt. % loss that started at 405° C.

By proton NMR, two signals were present in the final sample that proved diagnostically significant in confirming the desired structure formed. First, the CH2 groups adjacent to the bromine atom ($CH_2Br$) were present at 3.39 ppm. Second, the $CH_2$ groups adjacent to the newly formed alkyl aryl ether (PhOCH2) were present at 3.98 ppm. These two signals integrated 1:1 relative to one another as would be expected should the alkyl-aryl ether bond form between the alkyl halide and the polymer chain end. Further evidence of high end group conversion obtained by proton NMR was found by examining the aryl protons alpha to the OH group on the phenyl ring. These signals shifted quantitatively from 6.89 ppm to 6.95 ppm.

Example 2—Synthesis of Pentyl Bromide Terminated PPSU (1,5-Dibromopentane Added to PPSU Phenoxy Chain Ends) (Inventive and Preferred Way of Component Addition)

This example demonstrates the synthesis of a functionalized PPSU polymer, more precisely functionalized with two terminal molecules according to the following scheme:

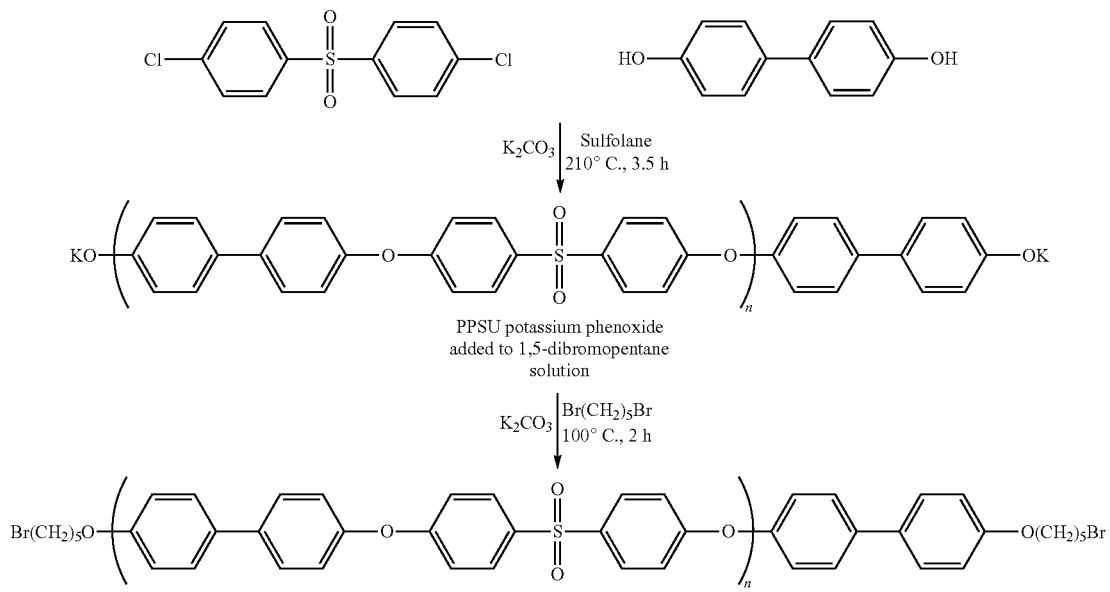

Formation of the KO-PPSU-OK Reactant Solution 4,4'-dichlorodiphenyl sulfone (14.34 g, 0.0499 mol, 1.00 eq), 4,4'-Biphenol (9.85 g, 0.0529 mol, 1.06 eq), $K_2CO_3$ (7.67 g, 0.0555 mol, 1.11 eq.), and sulfolane (46.67 g, 30 wt % solids) were combined in a 1 L 4-neck reaction vessel equipped with a mechanical stirrer, a Dean-Stark trap (wrapped in heat tape at ~100° C.), an internal thermometer, and a nitrogen sparge tube. The resulting mixture was then slowly heated with stirring (~30 min) to 210° C. and held at that temperature for 3.5 hours. Following build in molecular weight, the reaction mixture was then cooled to 150° C., diluted with anhydrous NMP (about 17 g), a second charge of $K_2CO_3$ was added (7.67 g, 0.0555 mol), and the mixture was continually stirred at 150° C. This describes the formation of the KO-PPSU-OK reactant solution.

Formation of the 1,5-Dibromopentane Reactant Solution

Separately, in a 250 mL 3 neck round bottomed flask equipped with a mechanical stirrer and nitrogen purge 1,5-dibromopentane (27.05 g, 0.118 mol, 20 eq to hydroxy end groups) was dissolved in NMP (16.67 g) and heated to 100° C. with continuous stirring.

Reaction of KO-PPSU-OK with 1,5-Dibromopentane

Subsequently, the KO-PPSU-OK reactant solution at 150° C. was slowly poured into the 1,5-dibromopentane solution stirring at 100° C. Upon complete addition of the KO-PPSU-OK to the 1,8-dibromooctane solution, the resulting mixture was allowed to stir for 2 hours at 100° C. and was then cooled to 25° C.

Isolation of Final Pentyl Bromide Terminated PPSU Polymer

To collect the final polymer, the reaction was further diluted with NMP (13 g), filtered via pressure filtration to remove potassium salts and then coagulated in a blender using hot water (500 mL). The precipitated white solid was then collected via vacuum filtration and repeatedly subjected wash/filtration cycles using methanol (6×500 mL) and hot water (3×500 mL). The washed solids were then dried in a vacuum oven (110° C., 36 mmHg) for 16 h to yield the final polymer as a white powder. GC-MS analysis of the solids indicated the presence of only 48 ppm residual 1,5-dibromopentane indicating the wash protocol was successful in removing the excess unreacted starting materials.

Characterization of Pentyl Bromide Terminated PPSU Polymer

The material obtained by the aforementioned process was characterized by GPC, TGA, DSC, and HNMR. GPC was used to determine molecular weights (Mn & Mw) and polydispersity index (PDI). TGA was used to determine the decomposition onset at 5% weight loss (Tdec (5% loss)). HNMR was used to determine end group conversions and to confirm expected bond connections. DSC was used to determine glass transition temperatures (Tg) and melting points (Tm), if present.

Results:
Mn=11,413 g/mol
Mw=23,388 g/mol
PDI of 2.05
Tg=200.4° C. No Tm was detected on the first or second heat.

The TGA analysis of the polymer gave a two-step decomposition profile. The first step showed a 2 wt. % loss that started at 298° C. and ended at 354° C. The second step showed a 55 wt. % loss that started at 408° C.

By proton NMR, two signals were present in the final sample that proved diagnostically significant in confirming the desired structure formed. First, the $CH_2$ groups adjacent to the bromine atom ($CH_2Br$) were present at 3.43 ppm. Second, the $CH_2$ groups adjacent to the newly formed alkyl aryl ether (PhOCH2) were present at 3.99 ppm. These two signals integrated 1:1 relative to one another as would be expected should the alkyl-aryl ether bond form between the alkyl halide and the polymer chain end. Further evidence of high end group conversion obtained by proton NMR was found by examining the aryl protons alpha to the OH group on the phenyl ring. These signals shifted quantitatively from 6.89 ppm to 6.95 ppm.

Example 3—Synthesis of Octyl Bromide Terminated PPSU (1,8-Dibromooctane Added to PPSU Phenoxy Chain Ends) (Inventive)

This example demonstrates the synthesis of a functionalized PPSU polymer, more precisely functionalized with two terminal molecules according to the following scheme:

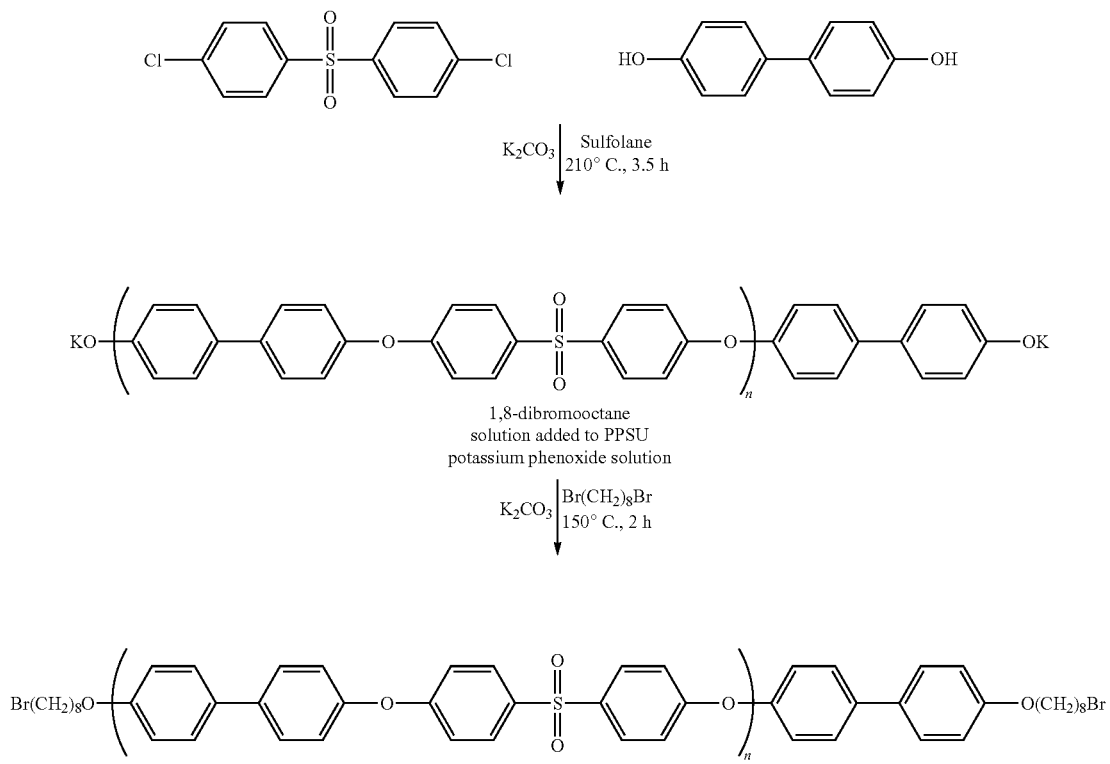

4,4'-dichlorodiphenyl sulfone (14.34 g, 0.0499 mol, 1.00 eq), 4,4'-Biphenol (9.85 g, 0.0529 mol, 1.06 eq), $K_2CO_3$ (7.67 g, 0.0555 mol, 1.11 eq.), and sulfolane (46.67 g, 30 wt % solids) were combined in a 1 L 4-neck reaction vessel equipped with a mechanical stirrer, a Dean-Stark trap (wrapped in heat tape at ~100° C.), an internal thermometer, and a nitrogen sparge tube. The resulting mixture was then slowly heated with stirring (~30 min) to 210° C. and held at that temperature for 3.5 h. Following build in molecular weight, the reaction mixture was then cooled to 150° C. and diluted with anhydrous NMP (about 33 g) and $K_2CO_3$ was added (7.67 g, 0.0555 mol). Following stirring for 10 min, 1,8-dibromooctane (32 g, 0.118 mol, 20 eq to hydroxy end groups) was slowly injected via syringe and the resulting mixture was allowed to stir for 2 h at 150° C.

To collect the final polymer, the reaction was further diluted with NMP (13 g) and subsequently filtered via pressure filtration to remove potassium salts followed by coagulation in a blender using Methanol (500 mL). The precipitated white solid was then collected via vacuum filtration and repeatedly subjected wash/filtration cycles using hot water (3×500 mL), methanol (3×500 mL), and acetone (2×500 mL) and was subsequently dried in a vacuum oven (110° C., 36 mmHg) for 16 h to yield the final polymer as a white solid.

With respect to GPC analysis, the sample obtained gave a Mn of 14,567 g/mol, a Mw of 35,290 g/mol, and a PDI of 2.42. Compared to the molecular weight values found for example 1, the Mn was significantly higher (14,567 g/mol vs 10,699 g/mol) as was the Mw (35,290 g/mol vs 21,679 g/mol) and the PDI (2.42 vs 2.03). This suggests that significant chain extension occurred upon introducing the 1,8-dibromooctane to the phenoxy chain ends. This means a portion of the 1,8-dibromooctane reacted at both ends thereby inserting an octyl chain in the backbone. Thus, the process described in comparative example 2 alters away from placing the desired octyl bromide groups exclusively at the chain terminus of the PPSU structure.

II. Synthesis of the Block Copolymers (P2)

Example 4—Synthesis of PES-b-PPSU Using Octyl Bromide Terminated PPSU of Example 1 (Inventive)

This example demonstrates the synthesis of a block copolymer comprising a PPSU-PES block copolymer using the functionalized PPSU polymer of example 1 and reacting it with an PhOK terminated PES oligomer according to the following scheme:

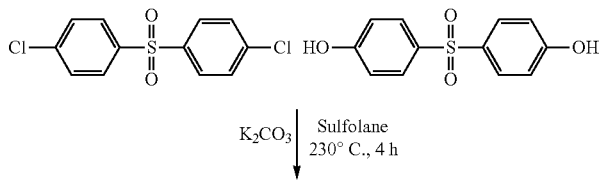

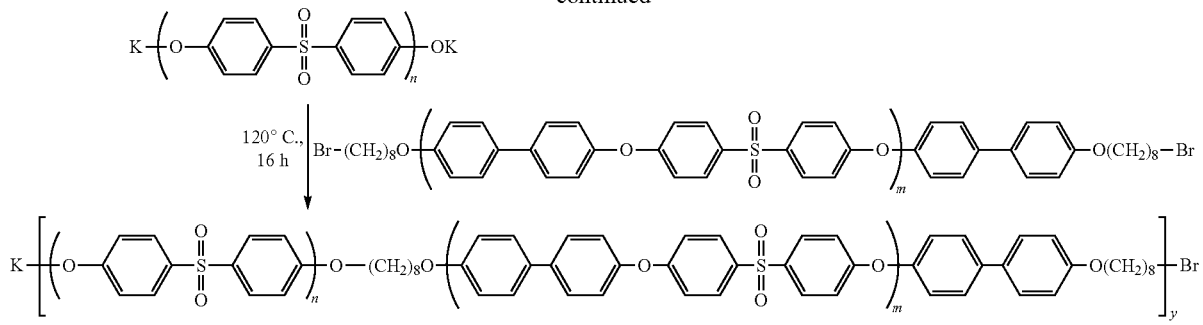

-continued

Formation of the KO-PES-OK Reactant 4,4'-dichlorodiphenyl sulfone (2.63 g, 0.0917 mol, 1.00 eq), Bisphenol-S (2.45 g, 0.00979 mol, 1.07 eq), K$_2$CO$_3$ (1.39 g, 0.0010 mol, 1.03 eq.), and sulfolane (11.85 g, 30 wt % solids) were combined in a 100 mL 3-neck reaction vessel equipped with a mechanical stirrer, a Dean-Stark trap (wrapped in heat tape at ~100° C.), an internal thermometer, and a nitrogen sparge tube. The resulting mixture was then slowly heated with stirring (~45 min) to 230° C. and held at that temperature for 4 h. Following build in molecular weight, the reaction mixture was then cooled to 150° C. and continually stirred.

Formation of the Octyl Bromide Terminated PPSU (Reaction Solution

Br(CH$_2$)$_8$O-PPSU-O(CH$_2$)$_8$Br according to Example 1 (4.67 g, 257.14 µeq/g end groups, 1:1 with respect to PES PhOK end groups) was dissolved in NMP (10.9 g, 30 wt. % solids) at 25° C. with continuous stirring.

Reaction of KO-PES-OK with Br(CH$_2$)$_8$O-PPSU-O(CH$_2$)$_8$Br

Subsequently, the KO-PES-OK solution stirring at 150° C. was injected via syringe into the Br(CH$_2$)$_8$O-PPSU-O(CH$_2$)$_8$Br reactant solution at 25° C. Upon complete addition, the resulting mixture was allowed to equilibrate to a temperature of 120° C. for 16 hours at which point the reaction was cooled to 25° C.

Isolation of Final PES-b-PPSU Block Copolymer

To collect the final block copolymer, the reaction was further diluted with NMP (8.5 g), filtered via pressure filtration to remove potassium salts and then coagulated in a blender using a 1:1 mixture of hot water/methanol (500 mL). The precipitated white solid was then collected via vacuum filtration and repeatedly subjected wash/filtration cycles using hot water (3×500 mL). The washed solids were then dried in a vacuum oven (110° C., 36 mmHg) for 16 h to yield the final polymer as a white powder.

Characterization of PES-b-PPSU Block Copolymer

The material obtained by the aforementioned process was characterized by GPC, TGA, DSC, and HNMR. GPC was used to determine molecular weights (Mn & Mw) and polydispersity index (PDI). TGA was used to determine the decomposition onset at 5% weight loss (Tdec (5% loss)). HNMR was used to determine end group conversions and to confirm expected bond connections. DSC was used to determine glass transition temperatures (Tg) and melting points (Tm), if present.

Results:
Mn=23,286 g/mol
Mw=87,761 g/mol
PDI of 3.30.

The doubling of molecular weight (Mn) and quadrupling of Mw relative to the molecular weight of the Br(CH$_2$)$_8$O-PPSU-O(CH$_2$)$_8$Br produced in Example 1 confirms chain extension to form the desired PES-b-PPSU block copolymer.

The DSC analysis of the block copolymer gave a single Tg=219.4° C., which was expected in view of the identical Tg values of both PPSU and PES (typical Tg=220° C.).

The TGA analysis of the block copolymer gave a one-step decomposition profile. The first step showed a 56 wt. % loss that started at 403° C.

By proton NMR, one signal was present in the final PPSU-PES block copolymer sample that proved diagnostically the desired structure formed. The CH$_2$ groups adjacent to the bromine atom (CH$_2$Br) present at 3.39 ppm in the Br(CH$_2$)$_8$O-PPSU-O(CH$_2$)$_8$Br sample of Example 1 completely disappeared following block copolymerization leaving only a single broad peak present at 3.97 ppm. This peak is assigned to overlapping CH$_2$ alkyl aryl ether signals (PhOCH2-) arising from alkyl aryl ether connections made between the PES and PPSU (both PES-OCH2- and PPSU-OCH2 are at nearly identical chemical shifts).

The invention claimed is:

1. A poly(aryl ether sulfone) (PAES) polymer (P1) comprising:
recurring units (R$_{PAES}$) of formula (L):

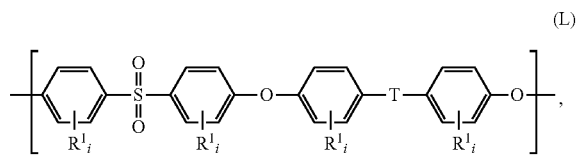

at least one terminal group of formula (M):

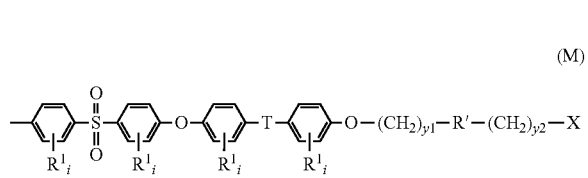

wherein:
each R$^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is an independently selected integer from 0 to 4;

T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, where each R$_a$ and R$_b$, independently of one another, is a hydrogen or a C1-C12-alkyl, C1-C12-alkoxy, or C6-C18-aryl group; —(CH$_2$)$_m$— and —(CF$_2$)$_m$— with m being an integer from 1 to 6; an aliphatic divalent group, linear or branched, of up to 6 carbon atoms; and combinations thereof;

y1 and y2 independently vary between 0 and 50, at least one of y1 or y2 being different from 0;

R' is a bond, a heteroatom, a (CH$_2$—CH$_2$—O)$_n$ group with n varying from 1 to 16, a C5-C40 aryl group, a C3-C40 branched aliphatic group or a C3-C40 cycloaliphatic group; and X is Cl, Br or I.

2. The PAES polymer of claim 1, wherein T is selected from the group consisting of a bond, —SO$_2$— and —C(CH$_3$)$_2$—.

3. The PAES polymer of claim 1, wherein the PAES polymer comprises at least 50 mol. % (based on the total number of moles in the polymer) of recurring units of formula (L).

4. The PAES polymer of claim 1, wherein the PAES polymer comprises at least 50 mol. % based on the total number of moles in the PAES polymer of recurring units selected from the group consisting of formulas:

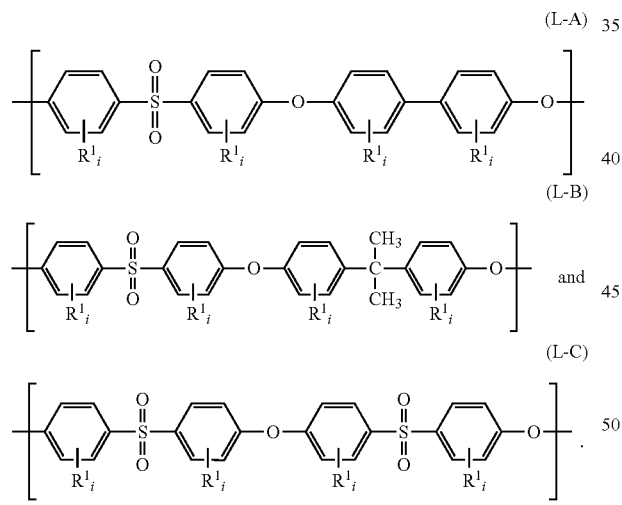

5. The PAES polymer of claim 1, wherein the PAES polymer has a number average molecular weight (Mn) of less than about 25,000 g/mol, as measured by gel permeation chromatography (GPC) using methylene chloride as a mobile phase, with polystyrene standards.

6. The PAES polymer of claim 1, wherein the PAES polymer has a number average molecular weight (Mn) of no less than about 1,000 g/mol, as measured by gel permeation chromatography (GPC) using methylene chloride as a mobile phase, with polystyrene standards.

7. The PAES polymer of claim 1, wherein the PAES polymer is such that R' is a bond, a heteroatom or a (CH$_2$—CH$_2$—O)$_n$ group with n varying from 1 to 16.

8. The PAES polymer of claim 1, wherein the PAES polymer is such that y1 varies between 1 and 40 and y2 equals 0.

9. A process for preparing the poly(aryl ether sulfone) (PAES) polymer (P1) of claim 1, comprising reacting a poly(aryl ether sulfone) (PAES) polymer (P0) comprising:

recurring units (R$_{PAES}$) of formula (N):

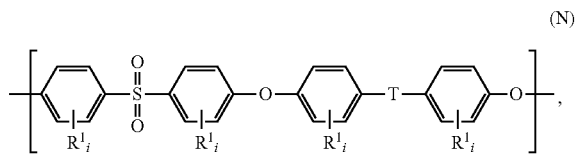

and at least one terminal group of formula (P):

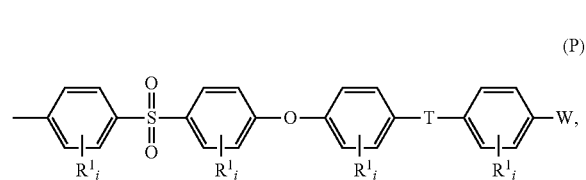

wherein:

each R$^1$ is independently selected from the group consisting of a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each i is an independently selected integer from 0 to 4;

W is O—R or S—R; and

R is H, K, Na, Li, Cs or a NHQ, where Q is a group containing 1 to 10 carbon atoms;

with a compound of formula (I)

X—(CH$_2$)$_{y1}$—R'—(CH$_2$)$_{y2}$—X    (I)

wherein

X is Cl, Br or I;

y1 and y2 independently varies between 0 and 50, at least one of y1 or y2 being different from 0;

R' is a bond, a heteroatom, a (CH$_2$—CH$_2$—O)$_n$ group with n varying from 1 to 16, a C5-C40 aryl group, a C3-C40 branched aliphatic group or a C3-C40 cycloaliphatic group; and wherein the molar ratio of compound (I)/polymer (P0) is higher than 1 optionally in the presence of a base and a polar aprotic solvent at a temperature ranging from room temperature and 250° C.

10. The process of claim 9, wherein the polymer (P0) is in the form of a phenoxide or a phenyl thiolate.

11. The process of claim 9, wherein:

the solvent is selected from the group consisting of N-methylpyrrolidone (NMP), N,Ndimethylformamide (DMF), N,N-dimethylacetamide (DMAC), 1,3-dimethyl-2-imidazolidinone, tetrahydrofuran (THF), dimethyl sulfoxide (DMSO) and sulfolane, and/or the base is selected from the group consisting of potassium carbonate (K$_2$CO$_3$), potassium tert-butoxide, sodium carbonate (CaCO$_3$), cesium carbonate (Cs$_2$CO$_3$) and sodium tert-butoxide.

12. The process of claim 9, wherein the polymer (P0) is added to the compound (I) which is in a stoichiometric excess and pre-dissolved in solution.

13. A process for preparing block copolymers (P2) comprising condensing at least the PAES polymer (P1) of claim 1, with at least a block polymer, optionally sulfonated, selected from the groups consisting of:
   aliphatic block polymers selected from the group consisting of polyolefins, polyesters (PE), polysiloxanes, polyalkylene oxide (PAO), polyamides (PA) and polyfluoropolymers, and
   aromatic block polymers selected from the group consisting of poly(aryl ether sulfone) (PAES) distinct from polymer (P1), poly(aryl ether ketone) (PAEK), poly(aryl sulphide) (PAS), poly(ether imide) (PEI), polyphenylene ether (PPE), Liquid Crystalline Polyester (LCP), polycarbonate (PC) and polyamideimide (PAI), in the presence of a base and a polar aprotic solvent at a temperature ranging from 50 and 250° C.

14. The process of claim 13, wherein the condensation takes place at a temperature ranging from 70 and 120° C., in a polar aprotic solvent selected from the group consisting of N-methylpyrrolidone (NMP), N,Ndimethylformamide (DMF), N,N-dimethylacetamide (DMAC), 1,3-dimethyl-2-imidazolidinone, tetrahydrofuran (THF), dimethyl sulfoxide (DMSO) and sulfolane, for at least 1 hour.

15. Block copolymers (P2) obtainable by the process of claim 13.

16. The process of claim 9, wherein the molar ratio of compound (I)/ polymer (P0) is higher than 5.

17. The process of claim 9, wherein reacting the PAES polymer (P0) is carried out in the presence of a base and a polar aprotic solvent at a temperature between 70 and 120° C.

* * * * *